Feb. 28, 1967 TOMOZO FURUKAWA ETAL 3,307,044

APPARATUS FOR SUPPRESSING THE APPEARANCE OF TRANSIENT RESPONSES OR SPIKES

Filed Jan. 20, 1964 2 Sheets-Sheet 1

Tomozo Furukawa INVENTORS.
Naoaki Wakayama
BY
Kurt Kelman
agent

TOMOZO FURUKAWA
NAOAKI WAKAYAMA
INVENTORS.
BY
Kurt Kelman
agent

United States Patent Office 3,307,044
Patented Feb. 28, 1967

3,307,044

APPARATUS FOR SUPPRESSING THE APPEARANCE OF TRANSIENT RESPONSES OR SPIKES

Tomozo Furukawa, Mito-shi, Ibaraki-ken, and Naoaki Wakayama, Naka-gun, Ibaraki-ken, Japan, assignors to Nihon Genshiryoku Kenkyu Sho, Minato-ku, Tokyo, Japan Filed Jan. 20, 1964, Ser. No. 338,753
Claims priority, application Japan, Jan. 22, 1963, 38/2,024
6 Claims. (Cl. 307—88.5)

This invention is related to apparatus for suppressing the appearance of the transient responses or spikes at the output side of a semiconductor chopper.

Although the semiconductor choppers have replaced mechanical choppers in recent usage, it is impossible in the semiconductor choppers to completely isolate the chopping circuit from the signal input circuit. Therefore, the transient responses or spikes due to high frequency components of the chopping waveform appear in the output of the chopper. Thus prior art semiconductor choppers cannot be employed for chopping, high frequencies. Another disadvantage of prior art devices is that it is necessary to use a succeeding alternative current amplifier which has a wide dynamic range. Accordingly, the suppression of such transient responses or spikes would be desirable because it results in the practicability of the high chopping frequency and the broadening of the dynamic range for the input signal to be chopped to the same dynamic range as that of the succeeding alternative current amplifier. It has been known that the wave heights of the transient responses or the spikes of the semiconductor chopper are approximately proportional to the magnitude of the impedance of the chopper. Therefore, the advantages of this invention is most outstanding in the application to a chopper using a high impedance circuit.

Figure 1:
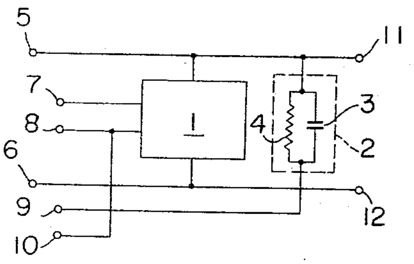
Figure 4:
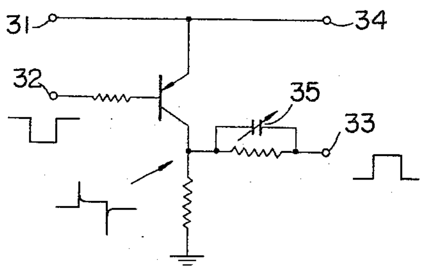
Figure 2:
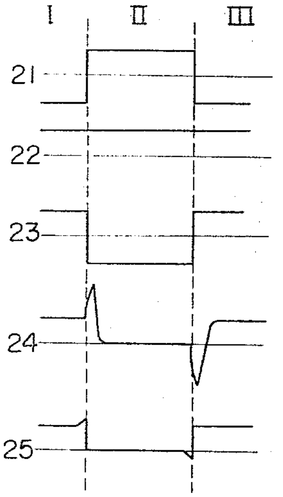
Figure 6:
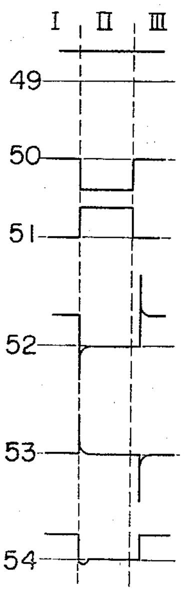
Figure 5:
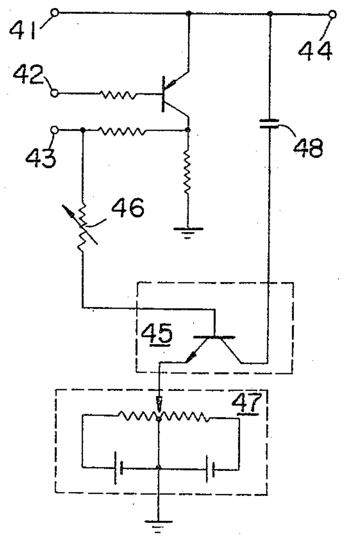
Figure 3:
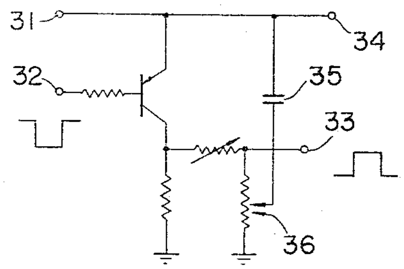
Figure 7:
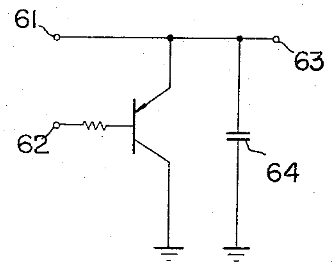
Fig. 7 PRIOR ART
Figure 8:
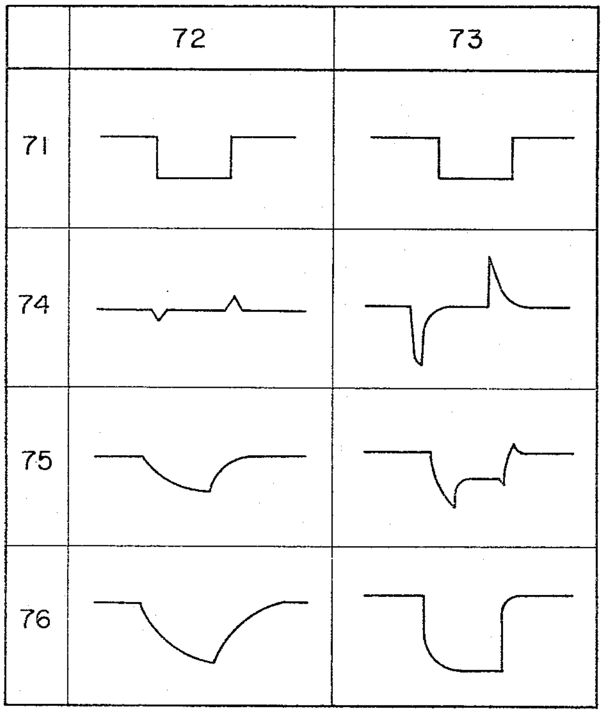

The object and advantage of this invention will become readily apparent from the following detailed description, in which:

FIG. 1 illustrates the principle of the method for the suppression of the transient responses or the spikes in the semiconductor chopper related to the present invention, FIG. 2 shows the waveforms of a signal at each part of the circuit illustrated in FIG. 1, FIGS. 3 and 4 are embodiments of mono-transistorized choppers using the suppressing method of this invention, FIG. 5 shows an embodiment of the invention adopting a nonlinear suppressing element with regard to minority carrier storage effect, FIG. 6 shows the waveforms of a signal at each point of the circuit depicted in FIG. 5, FIG. 7 shows the conventional suppressing method, and FIG. 8 shows the waveforms of a signal at each point of the circuit shown in FIG. 7.

The principle of this invention will be described in the following in connection with the drawings.

As an intuitive method for suppressing the transient responses or spikes in the semiconductor choppers, the method depicted in FIG. 7 has been adopted in prior art device. By this method, the rise and fall time of the output signal becomes long and the waveform of the output signal distorts in the presence of the input signal. These circumstances are shown in FIG. 7 and FIG. 8.

In FIG. 7, 61 is an input terminal for a signal to be chopped, 62 is an input terminal for the chopping waveform, 63 is an output terminal for the chopped signal, and 64 is a capacitor for suppression of said transients or spikes.

FIG. 8 illustrates the waveforms in the case of no signal input, small signal input, and large signal input, each corresponding to both the presence and the absence of the capacitor for suppression.

In FIG. 8, 71 is the chopping waveforms, 72 shows the output waveforms with the capacitor 64, 73 shows the output waveforms without the capacitor 64, 74 shows the output waveforms without the input signal, 75 shows the output waveforms when the input signal is small, and 76 shows the output waveforms when the input signal is large The incompleteness of this method will be apparent from FIG. 8.

In FIG. 1, 1 is a semiconductor chopper, 2 is an element for suppressing of the transient responses or spikes and which is the principal component of this invention, 3 is a linear or a nonlinear capacitor which is one of the components of said element, 4 is a linear or a nonlinear resistor which is one of the components of said element, 5 and 6 are input terminals of the signal, 7 and 8 are input terminals to which are applied the chopping signal, 9 and 10 are input terminals to which are applied the suppressing signal used to suppress the transient responses or spikes, and 11 and 12 are output terminals from which are derived the chopped input signal. Terminals 11 and 12 are connected to a load or an amplifier. FIG. 2 illustrates the waveforms of each point in FIG. 1 when the chopping waveform is rectangular. Domains I and III show the chopping periods while the semiconductor chopper 1 is nonconductive, whereas domain II shows the chopping period while the semiconductor chopper 1 is conductive. 21 is the chopping waveform which is given between the terminals 7 and 8 of FIG. 1. 22 is a waveform of input signal between the terminals 5 and 6 of FIG. 1. 23 is a waveform of the suppressing signal to give between the terminals 9 and 10 of FIG. 1. 24 is the output signal between the terminals 11 and 12 of FIG. 1 when the suppressing signal is not applied. 25 is the output signal between the terminals 11 and 12 of FIG. 1 with the application of the suppressing signal in making the value of the element 2 of FIG. 1 optimum.

In semiconductor choppers, the existence of both capacitance and resistance between the circuit to which the chopping signal is applied and the circuits to which the input signal is applied, for example, between the terminals 7 and 5 of FIG. 1 results in the appearance of the transient responses or the spikes due to the chopping waveform. Practically in most cases, their appearance will mainly be caused by the existence of capacitance, while the existence of the resistance may contribute to it in negligible order. If, as is in this invention, the suppressing input which is in inverse phase with the chopping waveform is applied through the circuit shown as the element 2 in FIG. 1 and composed of the capacitor 3 and the resistor 4 corresponding to the capacitance and the resistance across the terminals 5 and 7, the approximately complete suppression of the transient responses or the spikes at the output terminal can be achieved. The resistor 4 in FIG. 1 may be omitted when the main cause of the transient responses or spikes is the internal capacitance of the chopper circuit as in many practical cases.

When the semiconductor chopper is used, between the the time when the chopping input signal will be applied and the time when the chopper will become conductive or nonconductive, often exists some time-delay due to the minority carrier storage effect. In such a case, it is more efficient to provide the inverse phase signal between the terminals 9 and 10 of FIG. 1 with an appropriate time relation to the chopping waveform. Moreover, as the magnitude of the internal capacitance of the semiconductor chopper varies nonlinearly in accordance with the applied voltage, the suppression may be more perfectly achieved by using similar semiconductor elements as are in the chopper as a suppressing element. The semiconductor chopper has some variations in the wiring of the chopper itself and in the chopping means. In order to compensate the offset peculiar to it, sometimes it will be possible to obtain the suppressing signal for this invention from a part of them. Some examples considering these will be shown in the following.

FIGS. 3 and 4 are the embodiments of this invention applied to a transistor chopper which is chopped by rectangular waveform.

In FIGS. 3 and 4, 31 is an input terminal for the signal, 32 is an input terminal for the chopping signal, 33 is an input terminal for the signal to compensate for the voltage offset, 34 is an output terminal for the chopped signal, and 35 is a capacitor to suppress the transient responses or spikes. In this case it is convenient to make the capacitor 35 of FIG. 4 variable for obtaining the optimum suppression, while, for the same purpose, a variable resistor 36 is used in FIG. 3. In FIG. 4, spikes of inverse phase are equivalently applied to the output terminal by providing the compensating voltage with spikes. FIG. 5 illustrates the embodiment of this invention considering the time-delay caused by the minority carrier storage effect and using the nonlinear capacitor and resistor as the suppressing element.

In FIG. 5, 41 is an input terminal of the signal, 42 is an input terminal of the chopping signal, 43 is an input terminal of the signal to compensate the offset and suppress the spikes, 44 is an output terminal of chopped signal, 45 is a nonlinear element to suppress the spikes considering the time-delay caused by the storage effect of the minority carrier, 46 is a variable resistor to adjust the delay time, 47 is a circuit to adjust the nonlinearity of said element 45, and 48 is a capacitor which has as large capacity as possible within the range where the input signal may not be influenced upon.

In FIG. 6, from 49 to 54 are the waveforms of each part, where 49 is the waveform of the input signal, 50 is the chopping waveform, 51 is the signal to compensate the offset and to suppress the spikes, 52 is the output signal without the spike-suppression, 53 is the output signal with the spike-suppressing signal and without the chopping, and 54 is the waveform of the output signal with the chopping and spike-suppression, while domains I and III are the nonconductive periods and domain II is the conductive period of the chopper.

As is apparent in the above explanation, the application of this invention will facilitate the approximate completeness in suppressing the transient responses or the spikes at the output terminal of the semiconductor chopper, the chopping frequency of the semiconductor chopper by means of the high recurring frequency, and the easy design of the succeeding amplifier, and thus the invention may be very useful.

If the semiconductor chopper 1 is inserted between the terminals 5 and 11 (FIG. 1) the semiconductor chopper acts as a switch connected between the input and the output terminals. In this case there exists the completely same phenomenon.

While a preferred embodiment of the present invention is disclosed, it is recognized that the scope of the present invention is not limited thereto and it is therefore intended that the scope of the present invention be defined by the scope of the appended claim.

What is claimed is:

1. A semiconductor chopper circuit comprising:

(a) a transistor having a base, emitter and collector;

(b) first circuit means connected to the emitter of said transistor for applying thereto a signal to be chopped;

(c) second circuit means connected to the base of said transistor for applying a gating signal thereto;

(d) a compensating circuit means having a resistance-capacitance impedance characteristic comparable to that of the base-emitter circuit of said transistor and having an output terminal connected to the emitter of said transistor and an input terminal for receiving an input signal;

(e) a first gating signal source connected to said second circuit means; and (f) a second gating signal source connected to the said compensating means input circuit, said second gating signal source having a signal output similar to the output of said first gating signal source but opposite in phase.

2. The apparatus of claim 1 having means to vary the resistance characteristics of said compensating circuit.

3. The apparatus of claim 1 having means to vary the capacitance characteristic of said compensating circuit.

4. The chopper of claim 1 including a resistor connected between said compensating circuit input terminal and the collector of said transistor.

5. A semiconductor chopper comprising:

(a) a first transistor having a base, emitter and a collector;

(b) means for connecting a source of a signal to be chopped to said emitter and a point of ground potential, and means for deriving a chopped output signal between said emitter and a point of ground potential;

(c) a first two-terminal resistor having one terminal connected to the base of said first transistor and the other terminal adapted to be connected to a means for providing a pulsed control signal;

(d) a compensating signal input terminal;

(e) a first resistor connected between said first transistor collector and a point of ground potential;

(f) a second resistor connected between said compensating signal input terminal and said first transistor collector;

(g) a second transistor having a base, an emitter and a collector;

(h) a second resistor connected between said compensating signal input terminal and said second transistor base;

(i) a capacitor connected between said first transistor emitter and said second transmitter collector; and (j) adjustable voltage supply means connected to said second transistor emitter.

6. The apparatus of claim 5 wherein said second resistor connected to said second transistor base is variable.

References Cited by the Examiner

UNITED STATES PATENTS

| | | | |
|---|---|---|---|
| 2,838,618 | 6/1958 | Foster | 330—149 |
| 3,042,877 | 7/1962 | Barnes | 330—49 |

ARTHUR GAUSS, *Primary Examiner.*

J. BUSCH, *Assistant Examiner.*